Sept. 10, 1935. W. RAISCH 2,013,971
AUTOMATIC SCREENING AND FILTERING APPARATUS
Filed May 4, 1928 5 Sheets-Sheet 1

INVENTOR
William Raisch
BY Moakley & Gill
ATTORNEYS

Sept. 10, 1935.   W. RAISCH   2,013,971
AUTOMATIC SCREENING AND FILTERING APPARATUS
Filed May 4, 1928   5 Sheets—Sheet 3

INVENTOR
William Raisch
BY Moakley & Gill
ATTORNEYS

Sept. 10, 1935. W. RAISCH 2,013,971
AUTOMATIC SCREENING AND FILTERING APPARATUS
Filed May 4, 1928 5 Sheets-Sheet 4

INVENTOR
William Raisch
BY Moatley & Gill
ATTORNEYS

Patented Sept. 10, 1935

2,013,971

UNITED STATES PATENT OFFICE 2,013,971

AUTOMATIC SCREENING AND FILTERING APPARATUS

William Raisch, Forest Hills, N. Y., assignor to Municipal Sanitary Service Corporation, New York, N. Y., a corporation of New York Application May 4, 1928, Serial No. 275,115

17 Claims. (Cl. 210—196)

This invention relates to sanitation as effected by sewage disposal, and has for an object the provision of a method and means for eliminating the hazard to public health consequent upon the emptying into rivers and bays of sewage which pollutes such waters to a dangerous degree.

It is well understood that where improper reduction of pollution per unit of measure prevails, danger of the contraction of disease by bathers at the seashore, or by inhabitants of towns further down a river below other towns that empty sewage into the stream, is too real to be neglected. Accordingly, attempts have been made to so finally eject the sewage into a natural water basin or course that such sewage will be distributed throughout a comparatively extensive area, or in a river current, with a view to diluting it. Experience, however, indicated that this method was not entirely efficient, and to it was added a process of screening the sewage before it was emitted from the sewers. While this resulted in an improvement in sewage disposal, it, in turn, has left more satisfactory results to be yet attained.

Hitherto, the screens employed in sewer systems have either allowed the passage of too great a percentage of solid matter, or on the other hand, have become clogged by it, in the latter instances effecting a backing up of the sewage, and resulting in its overflow into the streets and into cellars of adjacent buildings. In some instances, the screens have been in danger of collapse. The present invention introduces screening apparatus, and an automatic regulation of its operation, whereby its performance is controlled in correspondence with the sewer conditions as they develop in the natural way.

The improved sewage-cleansing apparatus of this invention also generates a penetrable mat of the major solids of the sewage, which mat functions as a filter, whereby, while the aqueous portion of the sewage percolates through the natural filtering mat, the minor solids are collected by and with the major solids, and the total mass so accumulated is removed entirely from the sewer.

Arrangements have been made to cause a cessation of the operation of the novel sewage-cleansing apparatus, when the sewage level is low and its flow is negligible. Also, such operation automatically takes place at increased or diminished rates, in accordance with the variance in the volume of sewage passing through the sewer at different times, as at different hours in the day, and on certain days of the week as compared with other days.

Another feature lies in the operation of the sewage-cleansing apparatus to ordinarily take care of the usual normal so-called domestic sewage, but to instantly meet the emergency of handling storm water which runs into the street corner basins during a storm, and empties into the sewer. The automatic adjustment of the apparatus to normal and abnormal conditions, and its change from a normal operation proportionately to the increased actuation called for and to the abatement of abnormal requirements, marks the closeness with which it suits itself to the unavoidable fluctuations.

That the screen may be operated with high efficiency, appropriate cleaning brushes are provided together with operating means therefor. These brushes are controlled to recondition the screen prior to succeeding cycles of operation, so that all the cycles are equally effective.

Other advantages and features appearing hereinafter are obviously phases of the present invention, and are to be so regarded.

Figures 1, 6:
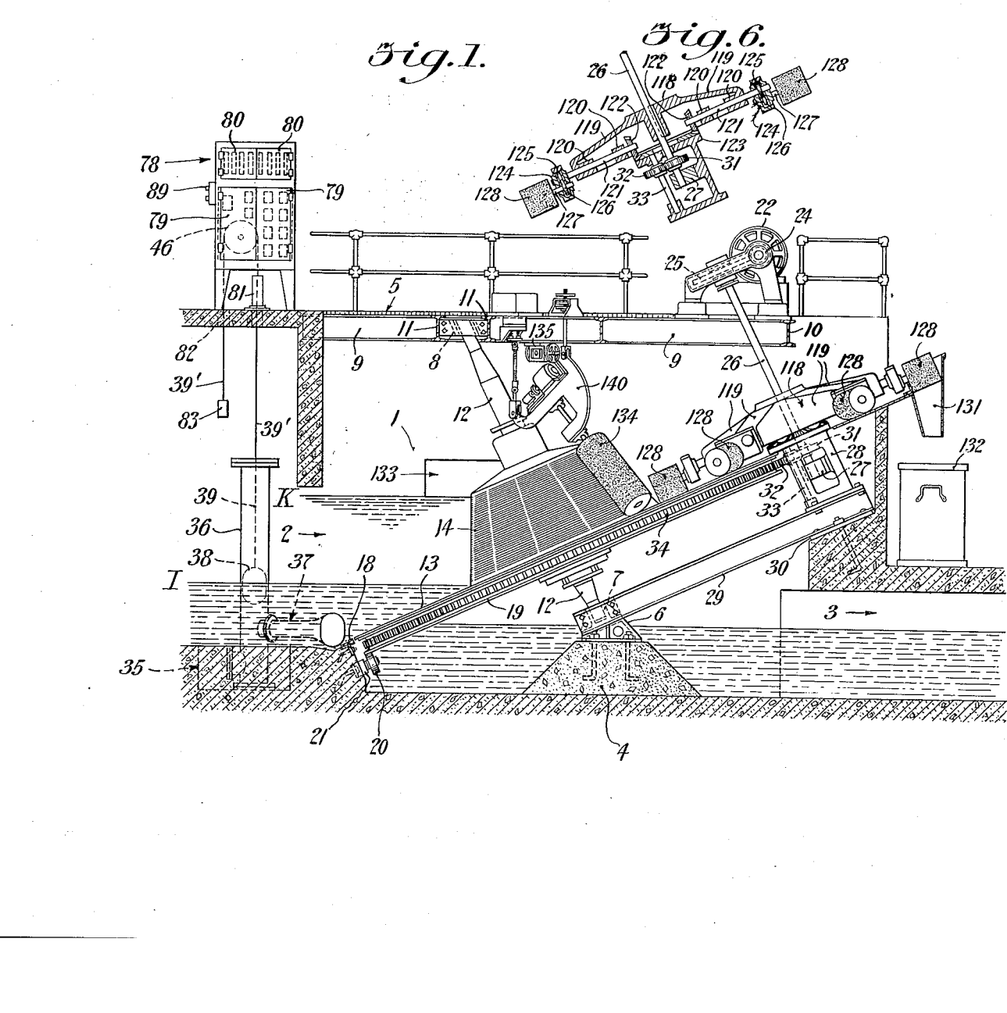
Fig. 1 is a vertical central section through a well, which is equipped with the automatically controlled screening and filtering apparatus, some of the parts being shown in elevation.
Fig. 6 is a sectional elevation through the disc-cleaning brushes, and the operating mechanism therefor.
Figures 2, 5:
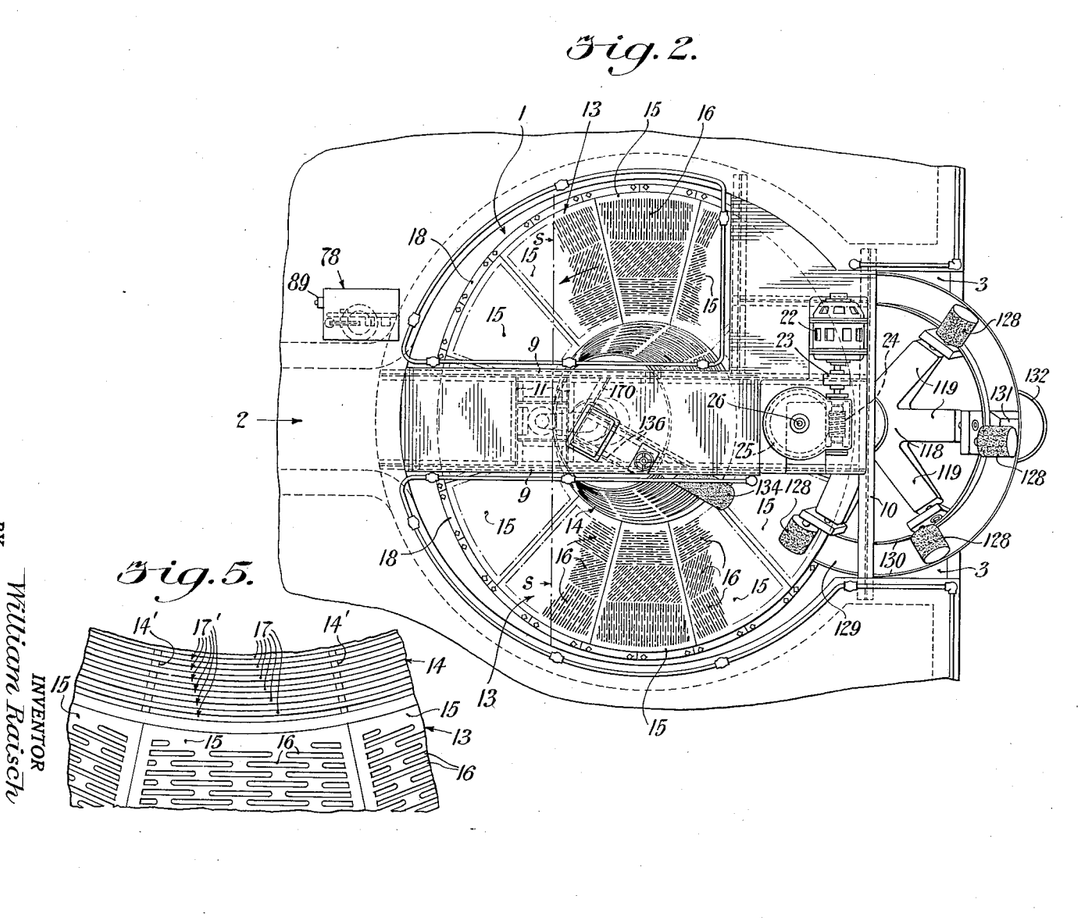
Fig. 2 is a plan view of the apparatus shown in Fig. 1.
Fig. 5 is another fragmentary view, showing the apertures in portions of the disc and cone.

Referring to the drawings, 1 represents a well, into which an influent channel 2 empties, and from which an effluent channel 3 leads. In the well, extending somewhat above the bottom thereof is a mound-like foundation 4, and extending substantially across the top of the well 1 is a bridge 5. Mounted on top of and anchored to the foundation mound 4 is a bearing casting 6, provided with a lower screen shaft bearing 7. An upper screen shaft bearing 8 is mounted in the framing of the bridge 5. As seen in Figs. 1 and 2, the bridge framing includes two longitudinal I-beams 9 supported at the left in the wall of the well 1, and at right by another I-beam 10 arranged transversely of the longitudinal beams. A pair of spaced I-beams 11 also extend transversely of the longitudinal beams 9 in the left hand portion thereof and support the upper bearing 8. The upper end of the inclined shaft 12 of the screen is mounted in the bearing 8, while the lower end of this shaft is journalled in the lower bearing 7.

Mounted on the shaft 12 to be rotatable is the rotary screen, which comprises what is termed a disc 13 and a cone 14. The disc 13 is in the nature of a flat perforated ring of considerable width surmounted by the hollow perforated truncated cone 14. The disc 13 may be made up of sectional plates 15 arranged as shown in Figs. 1 and 2, the plates 15 being provided with slots or apertures 16, shown better in Fig. 5.

The cone 14 is preferably constructed of annularly arranged ribbon wire, which may, in effect, correspond to hoops 17 forming the convex contour of the truncated cone, the wire hoops being of successively less diameter as they progress upwardly, and also being spaced from each other by amounts substantially corresponding to their own thicknesses to form elongated slots 17' between the inclined struts 14'. The proportion of the free open area in the disc 13 is to that of the cone 14 as 1 to 2, approximately, in the illustrated embodiment of the invention, for reasons that will become apparent hereinafter.

Due to the inclination of the shaft 12, the screen is tilted so that its toe, i. e., the lowermost portion of the circumference of the disc 13, is submerged in the sewage to a degree that positions this portion of the disc in proximity to the bottom of the influent channel 2. Where the channel 2 debouches into the well 1, the lower end of a sectional fixed ring 18 has its inner circumference closely fitted to the periphery of the disc 13. The fixed ring 18 is anchored to the concrete formation, and continues to follow the periphery of the disc 13, whereby the disc fits into the inclined circular opening so formed and with the screen cone 14 constitutes a screen barrier, which the incoming sewage must encounter before any of it can pass from the well 1 to the effluent channel 3.

The disc 13 rests on and is secured to an underframe 19, as shown in Fig. 1. A commercial channel, having upper and lower flanges and bent to form a circle, is used as the external circumscribing member of the underframe 19, the outer marginal edges of the plates 15 of the disc 13 being secured to the upper flange of the circular channel.

At the toe of the screen disc 13, the lower flange of the outlining channel of the underframe 19, as shown in Fig. 1, rests on a plurality of rollers 20 (only one of which is shown), the rollers being mounted on brackets 21 that are positioned on and anchored to the concrete. Thus, the submerged portion of the disc 13 is kept in properly fitting relationship to the fixed outlining ring 18, and, in times of increased hydraulic pressure, is adequately supported.

As shown in Figs. 1 and 2, an electric motor 22 is installed on an extension of the L-shaped bridge, and has its shaft joined through a coupling 23 with a shaft on which a worm 24 is rigidly mounted. Driven by the worm 24 is a worm gear 25 fast on and revoluble with a shaft 26, which is seen in both Figs. 1 and 6. The lower end of the shaft 26 is journalled in a bearing 27 that is mounted on a side wall of a pedestal 28, which is emplaced on obliquely disposed beams 29 of commercial form. The beams 29 are parallel with the inclined plane of the disc 13, their upper ends bearing on a metallic plate or seat 30 and being anchored to the concrete disposed therebelow. At their lower ends, the beams 29 rest on inclined seats on the casting 6, and are secured strongly in place. Above the bearing 27, a spur gear 31 is rigidly affixed to the shaft 26 and is in mesh with another spur gear 32 on a short shaft 33. The gear 32 drives a gear ring 34, which is mounted on the web of the external circular member of the underframe 19 of the screen, thereby revolving the screen in an anticlockwise direction as viewed in Fig. 2.

Figures 3, 4, 10:
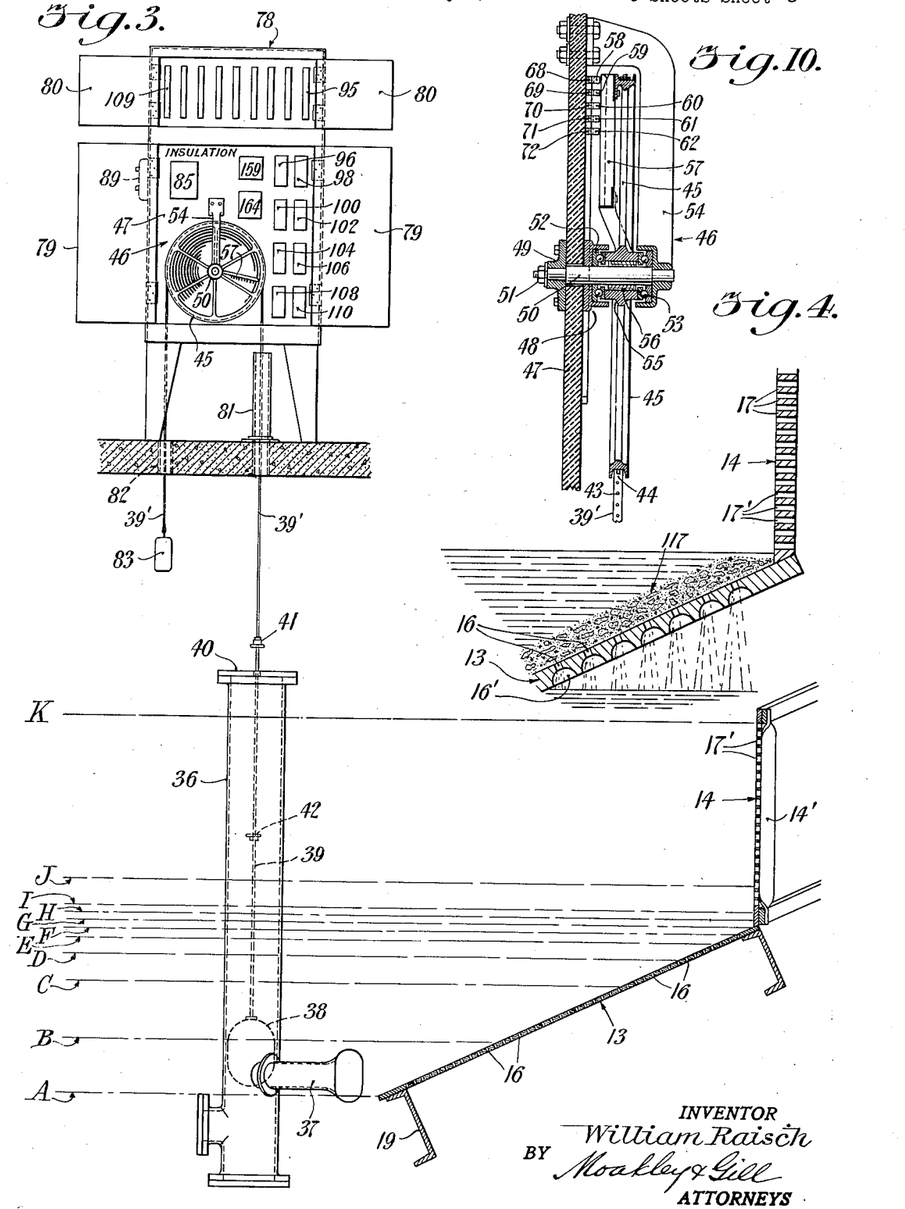
Fig. 3 is an enlarged view of portions of the apparatus as shown in Fig. 1, but with a part of the screen shown in section, and with the doors of the electrical cabinet thrown open.
Fig. 4 is a fragmentary sectional view, on a still greater scale, of portions of the disc and cone of the screen showing the formation of the mat on the former.
Fig. 10 is a fragmentary sectional view through the motor controlling switch.

That portion of the disc 13 of the revolving screen which is seen in the upper portion of Fig. 2, and which is above the level I indicated in Figs. 1 and 3, moves down toward the level I until it reaches a line s—s of submergence, indicated in Fig. 2. At this moment, there is a zero static head on the portion of the screen that is coincident with the line s—s of submergence. The level I is established as the maximum level to which domestic sewage will rise, from which it will be seen that the level of submergence may, and often will, be at some lower level, as at H, G, F, E, D, C, B or A. For the purposes of the present explanation, however, the sewage will be assumed to be at the level I.

That peripheral point of the screen disc 13 which is coincident with the line s—s of submergence will, at the moment referred to, be affected by a zero static head. As the screen continues to turn, this peripheral point will reach its lowest possible position, so that it becomes the toe of the screen, at which time it will be at the bottom of a static head A—I indicated in Fig. 3. Further revolution of the screen reduces the static head until it again becomes zero. It is accordingly evident that for handling normal domestic sewage, the range of levels of sewage will be between the heights A and I.

Were the screen to be revolved at uniform speed for all levels, as has heretofore been the case, three conditions would obtain, i. e., one in which the sewage would flow too freely through the screen and fail to relinquish a proper amount of its solids; another wherein the lack of sufficient speed would cause excessive accumulations of solids on the screen seriously clogging it; and an intermediate condition of more or less satisfactory operation. The preponderating operation, in such case, is, however, unsatisfactory.

To eliminate the unsatisfactory operation and to improve the partially satisfactory functioning of the screening apparatus, a regulation of the operation of the screen has been provided. An improved comprehension of this regulation will result from an inspection of Fig. 3, wherein in the toe of the screen disc 13 is seen to be at the level A. The sewage will be approximately at this level, for example, during that part of the night when residences and factories are silent, or upon Sundays and holidays. At the level B, a somewhat increased influx of sewage has occurred, and further increases in the intake of sewage into the sewer raises its height successively to the levels indicated at C, D, E, F, G, H and I.

When at the level I, the domestic sewage has reached a height, which is just below the bottom aperture in the screen cone 14, and this is considered the maximum level for the disposal of domestic sewage, when it is at the greatest height in its normal fluctuations. At the level I, the domestic sewage covers all of the apertures in the screen disc 13 which are allotted to the maximum normal operation of the apparatus. Should the sewage rise still higher, when it reaches the level J, the screen will be operated at its maximum rate to hold the level of the sewage down.

Reference will now be made to the screen operating means. Mounted on the bottom of a pit 35 that, as shown in Fig. 1, extends below the bottom of the influent channel 2 is a vertical float tube 36, having a horizontally disposed inlet tube 37, which extends toward the toe of the screen disc 13 and is flared at its mouth, the tube 37 tending to exclude solids by making it easier for them to flow toward the screen disc 13. Within the tube 36 is a float 38 to the upper end of which a flexible cable 39 is attached. The top of the float tube 36 is closed by a cap 40 that is apertured for the passage of the cable 39, upper and lower stops 41 and 42, respectively, being fast on the cable above and below the cap 40 to co-act therewith in limiting the possible movement of the cable. The continuation of the cable which extends above the upper stop 41 is in the nature of a flat strap 39' provided with predeterminedly located holes 43 adapted to be engaged by pins 44 annularly spaced around the groove in the periphery of a sheave 45, as seen in Fig. 10.

The sheave 45 forms part of a dial switch 46, which, as shown in Fig. 10, has a base plate 47 of insulation. Fastened to the front face of the insulating base 47 is a recessed casting 48, while axially aligned therewith on the opposite side of the base and bolted thereto is another casting 49. A central stud 50 has a reduced portion extending through the rear casting 49, a lock-washer and a nut 51 being applied to the threaded end of stud 50. Thus, the shoulder between the larger and smaller diametered portions at the left of the stud 50 is tightly drawn against the rear casting 49, and the stud 50 projects outwardly from the front face of the insulating base 47.

Seated in the recess in the front casting 48 is an end thrust ball bearing 52, another such end thrust bearing 53 being inset in the lower end of a rigid arm 54, which has its upper end bolted to the insulating base 47. Mounted on the stud 50 between the end thrust ball bearings 52 and 53 is the hub 55 of the sheave 45, this hub containing a roller bearing 56 that rides easily on the stud 50.

Figure 9:
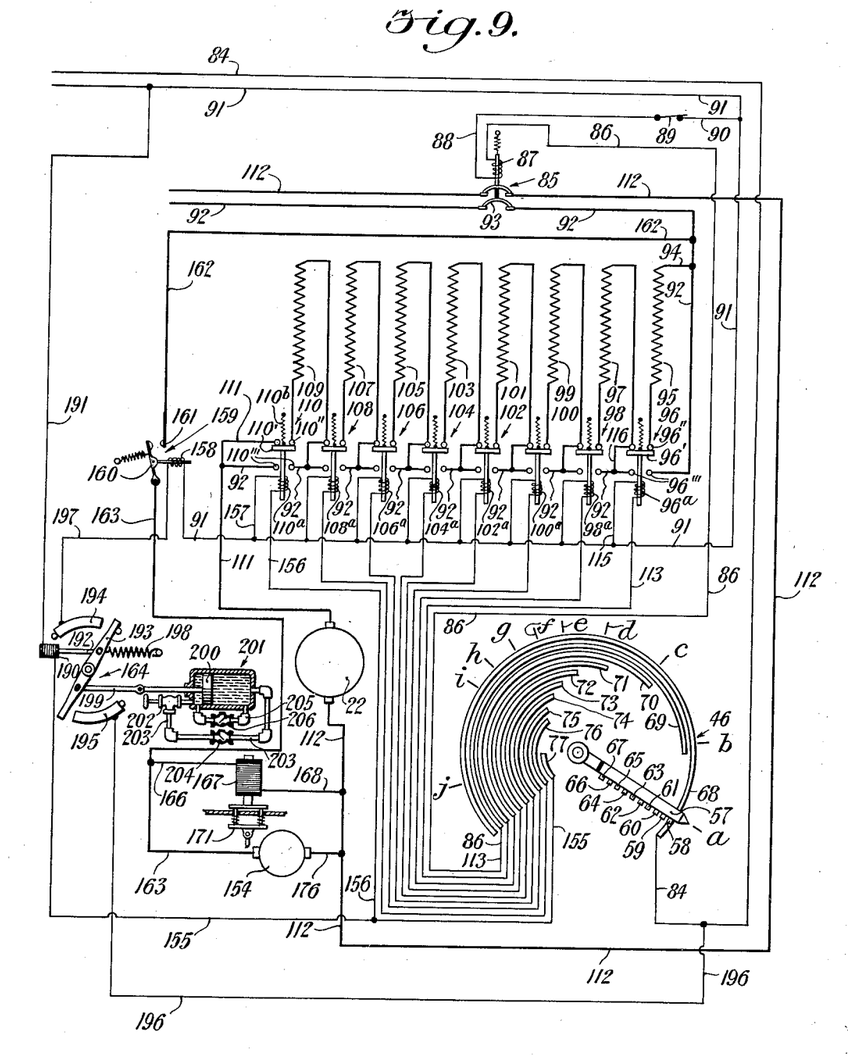
Fig. 9 is a diagrammatic view of the electrical devices and circuits included in the apparatus.

Fastened to the inner side of the sheave 45, so as to extend radially from the sheave hub is a brush-carrying arm 57, on which are spaced contact brushes 58, 59, 60, 61, 62, 63, 64, 65, 66 and 67 as shown in Figs. 9 and 10. The brushes 58 to 67 inclusive have permanent electrical connection with the arm 57, but this arm is insulated from the sheave 45, which carries it. As best seen in Fig. 9, the brushes 58 to 67 inclusive are adapted to individually engage fixed arcuate contacts 68, 69, 70, 71, 72, 73, 74, 75, 76 and 77 that are mounted on the insulating base 47, as shown in Fig. 10. The base 47 and the dial switch 46 are mounted in a cabinet 78 shown in Figs. 1 and 3, the cabinet being provided with doors 79 for closing a compartment in which the switch 46 and other units are installed. Other doors 80 close a smaller upper compartment in which resistances that are later referred to are installed. In the larger compartment which contains the dial switch 46, other switches are conveniently mounted, and are included in circuits which are described fully hereinafter.

The flexible flat strap 39' passes through the floor that supports the cabinet 78 by extending through a vertically arranged tube 81, shown in Figs. 1 and 3. After passing over the sheave 45, the flexible strap 39' passes through another tubular passage 82, shown in Figs. 1 and 3, and has a counterweight 83 attached to its lower end. With the described arrangement, whenever the level of the sewage changes, the float 38 rises or falls, as the case may be. There is a consequent vertical displacement of the cable 39 and its perforated strap extension 39', the pins 44 on the periphery of the sheave 45 being displaced by the strap 39' into which they project. As the sheave 45 is correspondingly turned with exactness, the brush contact arm 57 is similarly turned, and this in accordance with the level of the sewage.

If, for example, the height of the sewage is at the level A, indicated in Fig. 3, the rotary brush arm 57 will be in the position shown in Fig. 9. Tracing the control circuit in that figure, from the line conductor 84 to the long arcuate fixed contact 68 of the dial switch 46, it is found that the circuit extends through the rotary switch arm 57 to all of the contact brushes, 59 to 67 inclusive. But, none of these brushes is electrified, since there is no return path to the other side of the line of the control circuit.

Under these circumstances, current in the power circuit will not flow, since the circuit breaker 85, shown in Fig. 9, will be open, as it is of a type which has an actuating solenoid in the control circuit, which must be energized to operate the circuit breaker to close the power circuit.

Assuming, now, that the sewage rises to the level B, shown in Fig. 3, the accompanying rise of the float 38 to that level causes the cable 39—39' to be moved up, the counterweight 83 moving down. The holes 43 in the flexible strap 39' carry the pins 44 on the sheave 45 around an amount corresponding to the rise of the sewage to level B, as will be understood from Figs. 3 and 10. Referring again to Fig. 9, the brush arm 57, which is on the sheave 45, will have moved from the position a to the position b.

Accordingly, current will now flow from the control line conductor 84 to the circular fixed current supply contact 68, through a part of the arm 57, passing by the brush 59, that bears on the curved fixed contact 69, the current then going from the opposite end of contact 69 by a conductor 86 to the winding 87 of the circuit breaker solenoid. The current continues to flow by a conductor 88 to a switch 89, that is kept closed to render the apparatus operable and proceeding from switch 89 by a conductor 90 to the other control line conductor 91. The energization of the coil 87 of the circuit breaker 85 causes the latter to close the power circuit.

As a consequence, current in the power circuit will flow from the power line conductor 92, shown in Fig. 9, through one bridge 93 of the circuit breaker 85, thence going by a conductor 94 to and through a resistance 95, a closed switch 96, another resistance 97, a switch 98, a resistance 99, a switch 100, a resistance 101, a switch 102, a resistance 103, a switch 104, a resistance 105, a switch 106, a resistance 107, a switch 108, a resistance 109 and a switch 110. From this last switch the current goes by a conductor 111 to the electric motor 22, returning therefrom to the other power line conductor 112. The electric motor 22 is, therefore, operated with all the resistances 95, 97, 99, 101, 103, 105, 107 and 109 included in the power circuit.

Referring to Figs. 1 and 6, it is seen that the motor 22 drives through the worm 24 and worm gear 25 to operate the shaft 26, so actuating the spur gears 31 and 32 to drive the ring gear 34, and hence the rotary screen comprising the disc 13 and cone 14. The rotation of this screen will be slow and in proportion to the flow of sewage.

In a similar manner, if the sewage rises to the level C, shown in Fig. 3, the float 38 will correspondingly rise, the flexible cable 39—39' proportionately turning the sheave 45 to turn the brush arm 57 until it is in a position c, indicated in Fig. 9. The brush 60 on the arm 57 will then bear on the curved contact 70, and the current will go from control line conductor 84, through arm 57 and brush 60, to curved contact 70, from the opposite end thereof by a conductor 113 to and through a solenoid winding 96a of switch 96, returning therefrom by a conductor 115 to the other control line conductor 91.

Energization of the solenoid winding 96a shifts the bridge-contact 96' against the influence of a spring from the contacts 96'' to the contacts 96''' of the switch 96. This results in current flowing from the power line conductor 92 through the bridge 96' and contacts 96''', a conductor 116, resistances 97, 99, 101, 103, 105, 107 and 109, the switches 98, 100, 102, 104, 106, 108 and 110 still having their upper contacts closed and their lower contacts open. As before, the current goes by conductor 111 to motor 22, from which it returns to the other power line conductor 112. Thus, the resistance 95 is cutout of the power circuit and the motor 22 operates at a somewhat increased speed, as does the rotary screen 13—14.

In the same manner, the float 38 will rise to other levels D, E, F, G, H, I, and J when the sewage so rises, due to increased intake thereof, though such intake will fluctuate in accordance with the demands made upon the sewer. Reference to Fig. 3 shows that predetermined levels have been selected to exercise a desired control of the motor 22 that drives the rotary screen 13—14. Inasmuch as it is desired to utilize only the disc 13 of the rotary screen to take care of the normal domestic sewage, the levels are established with increasing closeness as the static head of the sewage increases. The levels E to I inclusive are quite closely spaced, whereby the speed of the screen driving motor 22 will rapidly accelerate to restrain the rise of the sewage in a manner to be explained presently. As each successive upper level is reached, a successive resistance 97, 99, 101, 103, 105, 107 or 109 is cut out of the power circuit in the way already explained in connection with resistance 95.

When during the operation of the apparatus, the sewage level falls, the solenoid of the double throw switch which last closed its lower contacts, as, for example, the switch 110, will become de-energized. Thereupon the switch spring, as 110b, will cause the switch bridge, as 110' to move from the lower pair of switch contacts, as 110''', to the upper contacts, as 110'', again placing the resistance, as 109, controlled by that switch back into the power circuit. This slows the rotation of the motor and the rotary screen to a speed allotted to the level to which the sewage has receded. Thus, some or all of the resistances 109 to 95 are restored in the power circuit, thereby effecting a proper rate of rotation of the screen.

Regulation of the rotary screen 13—14, in the hereinbefore described manner, adjusts its rotation to the flow of the sewage that is consequent upon the level the sewage attains, so that a natural filtering mat of sludge 117 is built up on the submerged portion of the screen disc 13, as shown in Fig. 4. Thus, with the sewage at the level B, all of the resistance units 95 to 109 inclusive are included in the power circuit, and the motor 22 effects a slow turning of the rotary screen 13—14. With the comparatively slow rate of flow of the sewage when it is at the low level B, shown in Fig. 3, the correspondingly slow rate of rotation of the screen disc 13 gives sufficient time for the sludge mat 117 to form on the disc.

When the sewage rises to the level C, its greater volume is accompanied by a somewhat faster rate of flow. If there were no increase in the rotary speed of the disc 13, too much sewage would flow through its submerged portion in a given time interval, and too much sludge would accumulate on the screen disc, tending to clog it. Since, however, the screen is rotated at a proportionately faster speed, the rate of passage of sewage through the interstices of the submerged portion of the disc 13 is substantially the same as it was at the level B. As a result, the natural filtering mat is formed substantially as before.

For the levels D, E, F, G, H, I and J, the increases in the speed of rotation of the disc 13 is variously faster proportionately to the increasing rapidity of flow of the sewage, whereby substantially the same thickness is preserved in the natural mat of sludge. In view of this, a proper proportioning of the disc 13 and its apertures 16 will cause the mat of sludge to be of such consistency that, while the aqueous part of the sewage passes through the mat, the finer solid particles are caught by and combined with the mat. The sewage that passes from the well 1 and through the effluent channel 3 is, accordingly, very much cleaner by reason of the filtering by the natural sludge mat. Levels E, F, G, H and I are spaced but short distances apart, so that there is within the zone containing these levels a rapid acceleration of the motor 22 and the rotary screen, which tends to keep the maximum level of domestic sewage below the apertures of the cone 14.

To eliminate the collected sludge, rotary brushes are employed and included in the apparatus in the following manner. As seen in Figs. 1 and 6, a rotatable brush-carrying spider 118 is mounted on and keyed to the shaft 26, and is provided with hollow radiating arms 119. Each of these arms is internally provided with a pair of bearings 120, in which a shaft 121 is mounted. At their inner ends, the shafts 121 are provided with bevel gears 122, which mesh with a non-rotatable bevel gear 123 that is rigidly mounted on top of the pedestal 28.

Rotation of the shaft 26 by the motor 22 causes the rotation of the brush spider 118 and its radiating arms 119. As the shafts 121 necessarily accompany the arms 119, the bevel gears 122 on the inner ends of shafts 121, because of meshing with the non-rotatable bevel gear 123, rotate themselves and their shafts 121.

Extending beyond the ends of the brush spider arms 119, each shaft 121 enters a gear case 124, and within the same each shaft carries a spur gear 125 rigidly mounted on it. Each gear 125 meshes with another spur gear 126 fast on a shaft 127 that is also journalled in the same gear case 124. Outside and beyond the gear cases 124, the shafts 127 carry cylindrical brushes 128.

As seen in Fig. 2, the arrangement is such that, when in their disc-cleaning positions, the brushes 128 sweep in a partially radial manner across the perforated disc 13 of the rotary screen. Thus, the brushes 128 travel across the disc 13 from its inner to its outer margin, brushing and propelling the accumulated sludge into the entrance of a circular passage 129, which has upturned inner and outer flanges 130 between which the brushes travel after leaving the disc 13 and before passing upon it again.

As the rotary brushes 128 approach the limit of their travel toward the right in Fig. 2, they sweep their respective quotas of sludge into a chute 131 and then into a suitable receptacle 132, which may be of any form that best serves for the removal of the sludge.

The apertures 16 in the disc plates 15 are variously disposed to be best presented to the cleaning brushes as the latter change their direction due to having an annular path of travel.

During storms a considerable quantity of storm water enters the sewer, and the level of the sewage rises materially above the level I that is designed to be a maximum level under normal circumstances. Under these circumstances, the water above the level I flows through the larger and more extensive apertures in the cone 14. It is proposed to make the free open areas in the disc 13 and in the cone 14 vary from each other at the ratio of 1:2, approximately, though other ratios may be used when it is advantageous to employ them. Should the storm water be so voluminous as to seek to rise higher than the level K, shown in Figs. 1 and 3, it will escape through a weir 133 in the wall of the well 1, as seen in Fig. 1.

Figure 7:
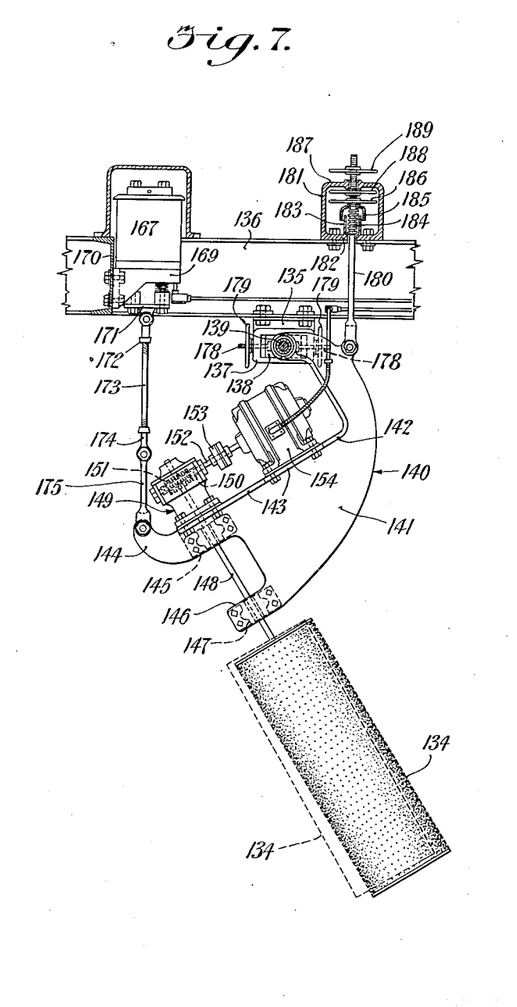
Fig. 7 is a vertical view of the cone-cleaning brush and its controlling mechanism, partly in section, as indicated by the line 7—7, of Fig. 8.
Figure 8:
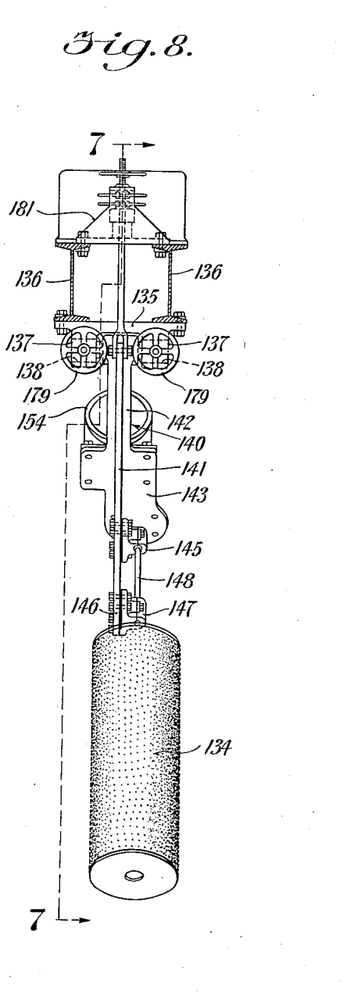
Fig. 8 is a view of the cone-cleaning brush and its operating mechanism, as viewed at right angles to Fig. 7.

The apertures in the cone 14 are kept clean and open by a cylindrical brush 134, shown in Figs. 1, 7 and 8. Thus, the sewage that passes through the cone 14 is allowed to do so freely, inasmuch as the admixture of the normal sewage and the storm water represents a highly diluted sewage, which is unobjectionable.

There being no need of a constant use of the cone-cleaning brush 134, it is mounted to occupy its full line position shown in Fig. 7. That it may occupy this position, it is provided with a peculiar mounting. As seen in Figs. 1, 7 and 8, a bearing casting 135 is mounted on the underside of the bottom flanges of a pair of spaced apart parallel I-beams 136. As shown in dotted lines in Fig. 2, the I-beams 136 are disposed obliquely with respect to the bridge longitudinal beams 9.

Fig. 8 discloses two downwardly projecting block guides 137, slidably mounted in each of which is a bearing block 138. Extending from one to the other of the blocks 138 is a shaft-like pivot 139, shown in section in Fig. 7. Mounted on the pivot 139 with ball bearings is the upper end of a bracket 140, which has a plate-like body portion 141 and a flange 142 that projects beyond both sides of the body portion. The flange 142 is substantially L-shaped, as shown in Fig. 7, and flares outward in both lateral directions to form a mounting seat 143.

Beyond the seat 143, as viewed in Fig. 7, the body portion 141 of the bracket is provided with an upward curling extension 144, and attached to the extension before it begins is an upper shaft bearing 145. The body portion 141 widens and also has a lower extension 146 on which is mounted a lower shaft bearing 147. Journalled in and extending through both the upper and lower bearings 145 and 147, respectively, is a shaft 148, on the lower end of which is mounted the cone-cleansing brush 134.

Passing above its upper bearing 145, the shaft 148 enters a gear housing 149, and carries a worm wheel 150, meshing with which is a worm 151 that is fast on a shaft 152, which is connected through a coupling 153 with the shaft of a brush-operating motor 154.

The center of gravity of the assembly which includes the bracket 140, the cone-cleansing brush 134, the motor 154 and the drive therefrom to the brush is so located that the brush swings away from the screen cone 14, when the brush is not being used, conserving the brush and lengthening its life. Inasmuch as the screen cone 14 is not brought into use until the normal maximum level of the sewage is exceeded, it is not until the resistances 95 to 109, shown in Fig. 9, have all been cut out of the power circuit that the cone-cleansing brush is used. When this happens, the float 38, shown in Figs. 1 and 3, will have risen above the level I shown in the latter figure, whereupon the arm 57 of the dial switch 46 shown in Fig. 9, will have been moved toward its position j, in the previously described manner, to cause its brush 67 to bear on the fixed curved contact 77 that corresponds to the level J of the sewage.

Current then flows from the line conductor 84 of the control circuit to the fixed curved contact 68, through arm 57 and its brush 67 to the fixed curved contact 77. It then proceeds by conductors 155 and 156 to and through the solenoid winding 110a of the double throw switch 110, and by a conductor 157 back to the other line conductor 91 of the control circuit. This causes the bridge 110' of the switch to leave the contacts 110'' and engage the contacts 110''', whereby the current flows from the line conductor 92 of the power circuit to conductor 111 and the screen-driving motor 22 back to the other power line conductor 112, driving the screen operating motor 22 at full speed. At the same time, the current in the control circuit conductor 155 also goes to the winding of a solenoid 190 of a retarded cut-off 164, and thence by a conductor 191 to the other control line conductor 91. Energization of the solenoid 190 causes its core to pull on a link 192, rotating an arm 193 of a switch counter-clockwise so that the opposite ends of the arm 193 engage relatively long arcuate fixed contacts 194 and 195. Current accordingly flows from the control line, conductor 84 by a conductor 196 to the fixed switch contact 195, through the switch arm 193 to the other fixed switch contact 194, then going by a conductor 197 to the winding 158 of the operating solenoid of a switch 159, and to the other control line conductor 91. The pivoted member 160 of the switch 159 is thus thrown into contact with the fixed switch member 161.

A branch of the power circuit is thereby closed from the power line conductor 92 through a conductor 162 to and through the members 161 and 160 of the now closed switch 159, thence going by a conductor 163 to a conductor 166 and through a lifting solenoid 167 and therefrom by a conductor 168 back to the other power line conductor 112.

Referring to Fig. 7, the casing of the lifting solenoid is carried by a bracket 169 that is bolted to a framing member 170 of the bridge 5. The core of the lifting solenoid is connected to and operates a cross-piece 171, pivoted to which is a clevis 172. Screwed into this clevis is a rod 173, which at its lower end is screwed into another clevis 174, but with a reversed thread, so that there is a resulting link which may have its length varied for adjustment purposes. Pivoted to the lower clevis 174 is the upper end of another link 175, the lower end of which is pivoted to the curved upper extension 144 of the body portion 141 of the bracket 140.

It is thus seen that the energization of the lifting solenoid 167 swings the bracket 140 about its pivot 139, and thus carries the cylindrical brush 134 against the screen cone 14 in parallelism with its inclined surface.

Again examining Fig. 9, the conductor 163 is seen to carry the power current to the brush operating motor 154 simultaneously with the energization of the lifting solenoid 167, the current returning from motor 154 by a conductor 176 to the power line conductor 112. The resulting operation of the motor 154 will, as shown in Fig. 7, drive the motor shaft and through the coupling 153 turn the worm 151 and the worm wheel 150. This revolves the shaft 148 and the cylindrical brush 134, which, since it now lies against the sloping wall of the cone 14 cleans it and keeps its interstices open.

As soon as the sewage falls to the level I, the consequent operation of the dial switch 46 effects the de-energization of the solenoid 190, whereupon, a spring 198 attached to one arm of the double-arm lever 193 rotates the latter clockwise. A link 199 pivoted to the other arm of the switch lever 193 accordingly pulls on the piston rod of a piston 200 in a dash-pot 201. The movement of the piston is retarded, since the fluid in the dash-pot which it displaces has a restricted flow, due to the setting of the needle valve 202 in a pipe system 203 which connects opposite ends of the cylinder of the dash-pot 201, and contains a check valve 204. The retarded disengagement of the movable switch arm 193 from the fixed elongated switch segments 194 and 195 keeps the solenoid 158 energized after the brush arm 57 has moved its contact 67 off the contact 77 of the dial switch 46, which would ordinarily de-energize the solenoid winding 158 of the switch 159, open the circuit and cause a cessation of the operation of the motor 154 and the cone-cleaning brush 134. Instead, however, the retarded opening of the switch comprising the contact members 193, 194 and 195 keeps the solenoid 158 energized, which holds the members 160 and 161 engaged and the power circuit closed, until the piston 200 in the dash-pot 201 slowly moves far enough to allow the switch arm 193 to pass off the curved segments 194 and 195.

When the switch arm 193 moves from its open position to engage the contacts 194 and 195, as the solenoid 190 is energized, the dash-pot piston 200 moves toward the right. The check valve 204 prevents the fluid from passing through the pipe system 203, causing it to flow through another pipe system 205 that contains a check valve 206. There being no needle valve in the pipe system 205, the flow of the fluid is relatively rapid, permitting a prompt closing of the switch comprising members 193, 194 and 195.

Accordingly, though the switch 159 opens as described, when the sewage reaches the normal level, current is still supplied to the lifting solenoid 167 and the motor 154, whereby the cylindrical cone-cleansing brush continues to function for a short period after the contacts 67, 77 have opened. Hence, with the sewage at abnormal height, if its fluctuations tend to cause the brush motor 154 to stop almost as soon as it starts, the continuance for a short period of the flow of current through conductors 163 and 166, solenoid 167 and motor 154 will insure that the brush 134 will still be held against the cone 14, and the motor 154 will continue to drive the brush until the portion of the cone of the rotary screen that contacts with sewage reaches and is cleaned by the brush irrespective of how quickly the sewage recedes from a motor-operating level. If desired, it may be arranged to cause the cone-cleansing brush 134 to be operated for one or two revolutions of the rotary screen every time the brush operating motor 154 becomes energized, or for any other suitable number of revolutions, or part of a revolution.

Each bearing block 138, shown in Figs. 7 and 8, is provided with threaded rods 178 at its opposite ends. These rods project through opposite ends of the block guides 137 and have hand wheels 179 threaded thereon, the wheels also co-acting with the guides, whereby the bearing blocks 138 may be adjusted to so position the bracket 140 that the brush 134 will lie properly against the screen cone 14. Non-uniform adjustment of the blocks 138 in the different guides 137 will produce a limited rotary adjustment of the brush 134, while uniform adjustment of the blocks in the same direction move the brush to bring it into closer or less close relationship to the cone 14.

That the bracket 140 and the brush 134 may hang properly the body portion 141 of the bracket is provided with an ear in its upper portion to which the lower end of a rod 180 is pivoted. A casting 181 spans and is rigidly mounted upon the framing I-beams 136. The rod 180 passes loosely through the bottom wall 182 of the casting 181, and through a vertically disposed cylindrical cup 183 that extends upward therefrom. Within the cup and encircling the rod 180 is a helical spring 184, on top of which an inverted cup-shaped cap 185 rests, the rod 180 passing loosely through the cap. Screwed on the upper threaded portion of the rod 180 is a handwheel 186, which bears on top of the cap 185. It is screwed up or down to regulate the spring 184, whereby the consequent pull of the rod 180 on the bracket 140 will, in connection with the previously referred to adjustments, give the bracket 140 and the brush 134 the proper hang.

The threaded portion of the rod 180 also passes loosely through an upper cross-bar 187 of the casting 181, and another handwheel 188 is screwed onto the rod 180 below the cross-bar 187. The position of the handwheel 188 is such that it engages the underside of the cross-bar when the brush 134 has swung away from the screen cone 14 by the desired amount.

Also screwed onto the upper end of the rod 180 is still another handwheel 189 that is positioned on the rod at a place which will cause the underside of its hub to come into contact with the top surface of the cross bar 187, when the lifting magnet 167 has drawn the brush 134 into proper contact with the screen cone 14.

It is obvious that the apparatus herein set forth is comprised of rugged and durable elements not calculated to get easily out of order. The automatic control and regulation of the apparatus permits of a minimum of attention to it, and its self-adjustment to all the conditions with which it is required to deal not only promotes efficiency in operation, but avoids periods of necessary remedy and repair that would result without such automatic adaptation. The automatic cessation of operation of the apparatus, and parts of it, when there is no requirement for its and their use makes for economy. Removal of the increased amount of material, due partly to the use of the natural mat formation, results in the discharge of a liquid that is robbed of undesirable matter whereby the effluent fluid is in satisfactory condition.

While a preferred embodiment of the invention has been shown and described, it is manifest that various alterations and adaptations may be indulged in, and the apparatus put to any other use than that described for which it is adapted, without departing from the spirit of the invention, as defined by the appended claims.

What I claim is:

1. In apparatus of the class described, a structure forming a passage for fluid, a movable foraminous barrier in the passage having portions for the passage of fluid at different rates and adapted to prevent passage through said barrier of certain substance in the fluid, operating means for said barrier, a control therefor operable according to the level of fluid in the passage, and cleansing mechanism for said different portions of said barrier that for one portion being operable only when the fluid rises above a given level.

2. In apparatus of the class described, a structure forming a passage for fluid, a movable foraminous barrier having portions for the passage of fluid at different rates and adapted to prevent passage through said barrier of certain substance in the fluid, operating means for said barrier, a control for said operating means actuable in accordance with various levels of the fluid, and different cleansing means for said fluid-passing barrier portions one being operable only after fluid passes through one of said barrier portions, and another being operable and inoperable coincidently with the actuation of said barrier.

3. In apparatus of the class described, a receptacle through which fluid flows at various levels, an inclined rotary screen comprising a disc portion extending substantially to a minimum level for the fluid and above a normal maximum level therefor and an annular laterally projecting portion extending above said normal maximum level, means controlled by the fluid at different levels to rotate said screen at varying speeds to form a filtering mat on said disc portion of substance in the fluid, cleansing means for said screen portions, that for said disc portion operating concomitantly with the rotary screen, and that for said laterally projecting portion being operable when the fluid is at a higher level than said normal maximum level.

4. In apparatus of the class described, a rotary screen having an annular foraminous wall adapted to accumulate substance from fluid flowing therethrough, means for rotating said screen, brushing means for cleansing said wall, a hinged support for said brushing means hinged to swing about a single axis, operating means for said brushing means carried by said support, and means to swing said support to bring said brushing means into and out of parallelism with said wall as it respectively engages and disengages the wall.

5. In apparatus of the class described, a rotary screen forming a foraminous frustum adapted to accumulate substance from fluid flowing therethrough, means for rotating said screen, brushing means for cleansing said frustum, a pivoted support for said brushing means arranged to hold said brushing means out of engagement with said frustum, operating means for said brushing means mounted on said support, and means including a solenoid operable to draw said brushing means into engagement with said frustum.

6. In apparatus of the class described, a rotary screen having different portions including a conical foraminous wall, means for rotating said screen, an intermittently active brush device for cleansing said conical wall, the portion of said screen to which the brush device is applicable being normally out of fluid that passes through another of said screen portions, and operating means for said brush device including a separate motor, said operating means being actuated when excess fluid flows through said conical foraminous wall.

7. In apparatus of the class described, a rotary screen through different portions of which fluid is adapted to flow with different degrees of continuity, mechanism for rotating said screen, a motor for driving the same, a brush device, means for intermittently contacting the same with said screen, a separate motor for operating said brush device, and means operable in response to an excessive flow of the fluid to simultaneously actuate said intermittent brush-contacting means and said motors and to actuate only the motor for said screen-rotating mechanism during a normal flow of the fluid.

8. In apparatus of the class described, a rotary screen forming a foraminous wall through which fluid is adapted to flow, operating means for said screen, a brush device for cleaning the screen wall normally out of contact therewith, motor-driven actuating means for said brush device, and electro-magnetic means operable to effect engagement of said brush device with said screen wall.

9. In apparatus of the class described, a rotary screen forming a foraminous wall through which fluid is adapted to flow, operating means for said screen, a brush device for cleaning the screen wall tending to remain out of contact therewith, operating means for said brush device including a motor, electro-magnetic means operable to effect the engagement of said brush device with said screen wall, electrical circuits for said motor and electro-magnetic means, making and breaking means for said circuits, and a retardation device connected with said circuits and effective to delay the opening thereof after said making and breaking means act to open them.

10. In apparatus of the class described, a rotary screen forming a foraminous wall through which fluid is adapted to flow, operating means for said screen, a support, a pivotal mounting therefor, a brush device mounted on said support, actuating means for said brush device, pressure-exerting means acting on said support to tend to position the brush device out of contact with said screen wall, means to move said brush device into contact therewith, and adjustable elements limiting the movement of said brush device.

11. In apparatus of the class described, a rotary screen forming a foraminous wall through which fluid is adapted to flow, operating means for said screen, a support, a pivotal mounting therefor, a brush device mounted on said support, actuating means for said brush device, pressure-exerting means acting on said support to tend to position the brush device out of contact with said screen wall, means to move said brush device into contact therewith, adjustable elements limiting the movement of said pivoted support and brush device toward and from said screen wall, and adjusting means for said pivotal mounting operable to displace the pivot of said support to cause the latter and said brush device to be adjusted inwardly, outwardly or in a rotative manner.

12. In apparatus of the class described, a rotary screen forming a foraminous wall, a hanging support, a pivotal mounting therefor, a brush device mounted on said support, actuating means for said device, a solenoid and pressure-exerting means respectively mounted on opposite sides of the pivotal axis of said support and adapted to move the latter in opposite directions, and adjusting mechanism to maintain said pivoted support and the brush device thereon in a balanced position when said solenoid is de-energized, the solenoid being capable of overcoming said pressure-exerting means.

13. In apparatus of the class described, a rotary screen, cleansing means therefor, electrical operating means for said cleansing means, a control for said operating means, and retarding means operable to delay the cessation of operation of said operating means when said control is actuated to effect such cessation.

14. In apparatus of the class described, a duct for the passage of a stream of liquid therethrough, a foraminous barrier traveling across said duct, said foraminous barrier having one portion through varying areas of which the stream passes for normal variations of flow and a second portion through which the liquid flows more readily and which is used when said stream rises to abnormal levels, means for increasing the rate of travel of said barrier as the stream rises and decreasing such rate of travel as the stream falls, and means for removing from the foraminous barrier matter accumulated thereon.

15. In apparatus of the class described, a duct for the passage of a stream of liquid therethrough, an inclined rotary screen forming a barrier across said duct, said screen comprising an annular portion through varying areas of which the stream passes for normal variations of flow and a central portion through which the liquid passes more readily and which is used when said stream rise to abnormal levels, means for increasing the rate of rotation of the screen as the stream rises and decreasing such rate of rotation as the stream falls, and means for removing from the rotary screen matter accumulated thereon.

16. In apparatus of the class described, a duct for the passage of a stream of liquid therethrough, an inclined rotary screen forming a barrier across said duct, said screen comprising an outer annular portion through varying portions of which the stream passes as it rises and falls and a portion adjacent to the inner edge of said annular portion through which the liquid passes more readily than through said annular portion and which is used when the stream is above a predetermined level determined by the width of said annular portion, means for increasing the rate of rotation of the screen as the stream rises and decreasing such rate of rotation as the stream falls, and means for removing from the screen matter accumulated thereon.

17. In apparatus of the class described, a duct for the passage of a stream of liquid therethrough, an inclined rotary screen forming a barrier across said duct, said screen comprising an annular portion through varying areas of which the stream passes for normal variation of level and a central frusto-conical portion through which the liquid passes more readily and which is used when such stream rises to abnormal levels, means for increasing the rate of rotation of the screen as the stream rises and decreasing the rate of rotation as the stream falls, and means for removing from the screen material collected thereon.

WILLIAM RAISCH.